(12) United States Patent
Rennison et al.

(10) Patent No.: US 10,575,042 B2
(45) Date of Patent: Feb. 25, 2020

(54) MEDIA CONTENT SYNCHRONIZATION

(71) Applicant: British Telecommunications Public Limited Company, London (GB)

(72) Inventors: Jonathan Rennison, London (GB); Martin Trimby, London (GB); Andrew Gower, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/774,934

(22) PCT Filed: Nov. 15, 2016

(86) PCT No.: PCT/EP2016/077747
§ 371 (c)(1),
(2) Date: May 9, 2018

(87) PCT Pub. No.: WO2017/089183
PCT Pub. Date: Jun. 1, 2017

(65) Prior Publication Data
US 2018/0352286 A1 Dec. 6, 2018

(30) Foreign Application Priority Data
Nov. 27, 2015 (EP) .................................. 15196875

(51) Int. Cl.
*H04N 21/24* (2011.01)
*H04N 21/43* (2011.01)
(Continued)

(52) U.S. Cl.
CPC ..... *H04N 21/4305* (2013.01); *H04N 21/4126* (2013.01); *H04N 21/41407* (2013.01);
(Continued)

(58) Field of Classification Search
None
See application file for complete search history.

(56) References Cited

U.S. PATENT DOCUMENTS 8,588,171 B2 11/2013 Fukuoka et al.
8,644,261 B1 2/2014 Vargantwar et al.
(Continued)

FOREIGN PATENT DOCUMENTS

CN 102300168 A 12/2011
CN 104540043 A 4/2015
(Continued)

OTHER PUBLICATIONS

International Search Report for corresponding International Application No. PCT/EP2016/077747 dated Jan. 1, 2017; 6 pages.
(Continued)

*Primary Examiner* — Cai Y Chen
(74) *Attorney, Agent, or Firm* — Patterson Thuente Pedersen, P.A.

(57) ABSTRACT

Playing of first and second content streams delivered to respective first and second receiving devices is achieved following a seek command to one of the devices, by a synchronization controller which receives information identifying the segment in the first stream in which the start point is located, and the duration of time between the start point and the beginning of the next segment, and transmits a command to the second receiving device identifying a segment in a second stream, at which to resume play, and a time at which to start displaying, allowing the display controlled by the second receiving device to be resynchronized with the display controlled by the first receiving device after operation of the seek command on the first device.

9 Claims, 6 Drawing Sheets

(51) Int. Cl.

| | |
|---|---|
| H04N 21/41 | (2011.01) |
| H04N 21/433 | (2011.01) |
| H04N 21/61 | (2011.01) |
| H04N 21/462 | (2011.01) |
| H04N 21/414 | (2011.01) |
| H04N 21/845 | (2011.01) |

(52) U.S. Cl.
CPC ..... *H04N 21/4307* (2013.01); *H04N 21/4333* (2013.01); *H04N 21/4622* (2013.01); *H04N 21/6125* (2013.01); *H04N 21/8456* (2013.01)

(56) References Cited

U.S. PATENT DOCUMENTS

| | | | |
|---|---|---|---|
| 2002/0067909 A1* | 6/2002 | Iivonen | H04N 7/165 386/275 |
| 2002/0112244 A1* | 8/2002 | Liou | H04L 12/1827 725/93 |
| 2008/0267317 A1 | 10/2008 | Malladi et al. | |
| 2009/0274453 A1 | 11/2009 | Viswambharan et al. | |
| 2010/0077441 A1* | 3/2010 | Thomas | G06F 3/1415 725/133 |
| 2010/0216454 A1 | 8/2010 | Ishida et al. | |
| 2011/0305184 A1 | 12/2011 | Hsu et al. | |
| 2013/0170818 A1 | 7/2013 | Klappert et al. | |
| 2013/0229974 A1 | 9/2013 | Xu et al. | |
| 2013/0251329 A1 | 9/2013 | McCoy et al. | |
| 2013/0258934 A1 | 10/2013 | Amerga et al. | |
| 2013/0258935 A1 | 10/2013 | Zhang et al. | |
| 2013/0336173 A1 | 12/2013 | Mandil et al. | |
| 2014/0095668 A1 | 4/2014 | Oyman et al. | |
| 2014/0156800 A1 | 6/2014 | Falvo | |
| 2014/0169255 A1 | 6/2014 | Zhang et al. | |
| 2014/0286222 A1 | 9/2014 | Yu et al. | |
| 2014/0321826 A1 | 10/2014 | Stelmack et al. | |
| 2015/0009821 A1 | 1/2015 | Sridhar et al. | |
| 2015/0163379 A1 | 6/2015 | Herzog | |
| 2016/0081070 A1 | 3/2016 | Li et al. | |
| 2016/0234570 A1* | 8/2016 | Van Deventer | H04N 21/4307 |

FOREIGN PATENT DOCUMENTS

| | | |
|---|---|---|
| CN | 104954994 A | 9/2015 |
| EP | 1650989 A1 | 4/2006 |
| EP | 2244502 A1 | 10/2010 |
| EP | 2244502 B1 | 6/2011 |
| EP | 2606662 A1 | 6/2013 |
| EP | 2775730 A1 | 9/2014 |
| EP | 2 925 003 A1 | 9/2015 |
| EP | 3125582 A1 | 2/2017 |
| GB | 2483125 A | 2/2012 |
| JP | 2013070841 A | 4/2013 |
| WO | WO-2009094744 A1 | 8/2009 |
| WO | WO-2012137078 A2 | 10/2012 |
| WO | WO-2012142428 A1 | 10/2012 |
| WO | WO 2013/141874 A1 | 9/2013 |
| WO | WO-2014146617 A1 | 9/2014 |
| WO | WO-2015000912 A1 | 1/2015 |
| WO | WO 2015/039888 A1 | 3/2015 |
| WO | WO 2015/071461 A1 | 5/2015 |
| WO | WO-2015061983 A1 | 5/2015 |
| WO | WO-2015062443 A1 | 5/2015 |
| WO | WO-2015069407 A1 | 5/2015 |
| WO | WO-2015080407 A1 | 6/2015 |
| WO | WO-2015103947 A1 | 7/2015 |
| WO | WO 2015/166087 A2 | 11/2015 |
| WO | WO-2016029938 A1 | 3/2016 |
| WO | WO-2018001897 A1 | 1/2018 |
| WO | WO 2018/024395 A1 | 2/2018 |

OTHER PUBLICATIONS

Written Opinion for corresponding International Application No. PCT/EP2016/077747 dated Jan. 1, 2017; 6 pages.
ETSI TS 103 286-2 V1.1.1 (May 2015); Technical Specification; Digital Video Broadcasting (DVB); Companion Screens and Streams; Part 2: Content Identification and Media Synchronization; 650 Route des Lucioles F-06921 Sophia Antipolis Cedex—France; http://www.etsi.org/deliver/etsi_ts/103200_103299/10328602/01.01.01_60/ts_10328602v010101p.pdf; [Retrieved Apr. 24, 2018] 166 pages.
HbbTV 2.0.2 Specification; Feb. 16, 2018; HbbTV Association; https://www.hbbtv.org/wp-content/uploads/2018/02/HbbTV_v202_specification_2018_02_16.pdf [Retrieved Apr. 24, 2018] 313 pages.
Wu et al.; CloudMoV: Cloud-based Mobile Social TV; http://i.cs.hku.hk/~cwu/papers/ywu-tmm12.pdf; [Retrieved Apr. 24, 2018] 12 pages.
European Search Report for corresponding EP Application No. 15196875.7 dated May 19, 2016; 6 pages.
Application as filed for U.S. Appl. No. 16/318,553, filed Jan. 17, 2019, Inventor(s): Al-Daher et al.
International Search Report and Written Opinion for corresponding International Application No. PCT/EP2017/064946 dated Jul. 10, 2017; 9 pages.
Prasad et al; "Enabling group communication for public safety in LTE-Advanced networks", Journal of Network and Computer Application, pp. 41-52; revised Aug. 28, 2015; 12 pages.
Qualcomm Research; San Diego, "LTE eMBMS Technology Overview", Nov. 2012; 18 pages.
Prasad et al; "Enhancements for Enabling Point-to-Multipoint Communication Using Unlicensed Spectrum"; https://www.reserachgate.net/publication/324783210; May 1, 2018; 7 pages.
EP Extended Search Report for corresponding EP Application No. 16182850.4; dated Jan. 17, 2017, 7 pages.
GB Search and Examination Report for corresponding GB Application No. GB1613477.7; dated Dec. 19, 2016, 5 pages.
Prasad Athul et al; "Enabling group communication for public safety in LTE-Advanced networks" A Journal of Network and Computer Applications, Academic Press. vol. 62. Jan. 2, 2016 (Jan. 2, 2016) pp. 41-52 XP029418728 NY. US ISSN: 1084-8045. DOI: 10.1016/J.JNCA.2015.10.014 abstract Sections 1-6.
3GPP TR 23.768 V12.1.0 (Jun. 2014), "Study on Architecture Enhancements to Support Group Communication System Enablers for LTE (GCSE_LTE)," Technical Report, 3rd Generation Partnership Project, Technical Specification Group Services and System Aspects (Release 12), Jun. 2014, 63 pages.
3GPP TS 23.246 V9.5.0, release 9 (Jun. 2010), "LTE; Multimedia Broadcast/Multicast Service (MBMS), Architecture and Functional Description," Universal Mobile Telecommunications System (UMTS), Technical Specification, ETSI TS 123 246, Jun. 2010, 67 pages.
3GPP TS 23.468 V15.0.0 (Release 15), "LTE; Group Communication System Enablers for LTE (GCSE_LTE) Stage 2," Technical Specification Group Services and System Aspect, 3rd Generation Partnership Project, ETSI TS 123 468 V15.0.0, Jul. 2018, 32 pages.
Alcatel-Lucent, "Analysis of Service Continuity Requirement for Group Communication," 3GPP Draft; R2-140757, 3GPP TSG RAN WG2 Meeting #85, and Agenda Item: 7.6.3, Prague, Czech Republic, Feb. 10-14, 2014, 3 pages.
Catt, "Considerations on Service Continuity for eMBMS," 3GPP Draft; R2-134045, 3GPP TSG RAN WG2 Meeting #84, agenda Item: 7.6.3, San Francisco, USA, Nov. 2013, 4 pages.
Catt, "Evaluation on Service Continuity for eMBMS," 3GPP DRAFT; R2-140138, 3RD Generation Partnership Project (3GPP), Mobile Competence Centre ; 650, Route Des Lucioles ; F-06921 Sophia-Antipolis Cedex; France, vol. RAN WG2, Feb. 9, 2014, retrieved from URL: http://www.3gpp.org/ftp/Meetings_3GPP_SYNC/RAN2/Docs/, 3 pages.
Catt, "Methods for Service Continuity Improvement due to UE Mobility," 3GPP Draft; R2140141, 3GPP TSG RAN WG2 Meeting #85, Prague, Czech Republic, Feb. 10-14, 2014, 3 pages.
Combined search and Examination Report for Great Britain Application No. 1605519.6, dated Sep. 28, 2016, 4 pages.
Combined Search and Examination Report for Great Britain Application No. 1605525.3, dated Oct. 3, 2016, 8 pages.
Combined Search and Examination Report for Great Britain Application No. 1609547.3, dated Nov. 30, 2016, 6 pages.

(56) References Cited

OTHER PUBLICATIONS

Combined Search and Examination Report for Great Britain Application No. 1611277.3, dated Dec. 6, 2016, 8 pages.
Combined Search and Examination Report for Great Britain Application No. 1613477.7, dated Dec. 19, 2016, 5 pages.
Ericsson, "MBMS Service Continuity Aspects for Group Communication," 3GPP Draft; R2140821, 3rd Generation Partnership Project (3GPP), Mobile Competence Centre; 650, Route Des Lucioles; F-06921 Sophia-Antipolis Cedex, France, vol. RAN WG2, Feb. 9, 2014, retrieved from URL: http://www.3gpp.org/ftp/Meetings_3GPP_SYNC/RAN2/Docs/, 11 pages.
European Search Report for Application No. 16163451.4, dated Sep. 28, 2016, 8 pages.
European Search Report for Application No. 16163458.9, dated Sep. 20, 2016, 11 pages.
European Search Report for Application No. 16172341.6, dated Jun. 14, 2017, 10 pages.
European Search Report for Application No. 16182850.4, dated Jan. 17, 2017, 7 pages.
Huawei, HiSilicon "Service Continuity for Group Communication Over eMBMS," 3GPP Draft; R2-140261, 3GPP TSG-RAN WG2 #85, Prague, Czech Republic, Feb. 10-14, 2014, 7 pages.
International Preliminary Report on Patentability for Application No. PCT/EP2017/057026, dated Oct. 11, 2018, 10 pages.
International Preliminary Report on Patentability for Application No. PCT/EP2017/057470, dated Oct. 11, 2018, 10 pages.
International Preliminary Report on Patentability for Application No. PCT/EP2017/057474, dated Oct. 11, 2018, 8 pages.
International Search Report and Written Opinion for Application No. PCT/EP2017/057026, dated Apr. 18, 2017, 14 pages.
International Search Report and Written Opinion for Application No. PCT/EP2017/057470, dated Jun. 19, 2017, 12 pages.
International Search Report and Written Opinion for Application No. PCT/EP2017/057474, dated Jun. 13, 2017, 14 pages.
International Search Report and Written Opinion for Application No. PCT/EP2017/064946, dated Jul. 10, 2017, 13 pages.
International Search Report and Written Opinion for Application No. PCT/EP2017/065543, dated Jul. 24, 2017, 17 pages.
LG Electronics Inc, "Service continuity for group communication," 3GPP Draft; R2-140766, 3GPP TSG RAN WG2 #85, Agenda Item: 7.6.3, Prague, Czech Republic, Feb. 10-14, 2014, 2 pages.
LTE, "Multicast Broadcast Single Frequency Network (MBSFN) Handbook," ShareTechnote, retrieved from http://www.sharetechnote.com/html/Handbook_LTE_MBSFN.html on Sep. 14, 2018, 13 pages.
NEC Corporation, "Enabling Service Continuity for Group Communication," 3GPP Draft; R2-140586_GCSE_SC, 3GPP TSG RAN2 Meeting #85, and Agenda Item: 7.6.3, Prague, Czech Republic, Feb. 10-14, 2014, 7 pages.
Prasad A., et al., "Enabling Group Communications for Public Safety in LTE-Advanced Networks," Journal of Network and Computer Applications, vol. 62, 2016, pp. 41-52.
Qualcomm Incorporated, "GCSE Service Continuity During Unicast and MBMS Switching," 3GPP Draft S2-133446 UC BC Switching, SA WG2 Meeting #99, Agenda Item: 6.5, Xiamen, China, Sep. 2013, 7 pages.
Qualcomm "LTE Evolved Multimedia Broadcast Multicast Service (eMBMS) Technology Overview," Qualcomm Research, San Diego, Nov. 2012, 18 pages.
Small Cell Forum, "X2 Interoperability," Release Four, Document 059.04.01, www.smallcellforum.org, Jun. 2014, 29 pages.
European Search Report for Application No. 16176922.9, dated Nov. 23, 2016, 11 pages.
International Preliminary Report on Patentability for Application No. PCT/EP2016/077747, dated Jan. 18, 2018, 10 pages.
DVB Organization: "ts_102796v010301p_draft_23-non-etsi-branding.pdf", DVB, Digital Video Broadcasting, C/O EBU—17A Ancienne Route—CH-1218 Grand Saconnex, Geneva—Switzerland, Oct. 9, 2014 (Oct. 9, 2014), XP017845818.
ETSI TS 123.246 "Universal Mobile Telecommunication System (UMTS); LTE; Multimedia Broadcast/Multicast Service (MBMS); Architecture and Functional Description (Release 9)," V9.5.0 (Jun. 2010); the 3rd Generation Partnership Project, pp. 1-67.
Examination Report for Great Britain Application No. 1605519.6 dated Sep. 27, 2018, 4 pages.
Written Opinion of the International Preliminary Examining Authority for Application PCT/EP2017/065543, dated Jun. 11, 2018, 11 pages.
ZTE, "Service Continuity for Group Communication due to UE Mobility," 3GPP Draft; R2140101, 3GPP TSG-RAN WG2#85, and Agenda Item: 7.6.3, Prague, Czech Republic, Feb. 10-14, 2014, 3 pages.
GB Examination Report for Application No. GB1521000.8, dated Nov. 27, 2017, 12 pages.
Application as filed for U.S. Appl. No. 16/310,948, filed Dec. 18, 2018, Inventor(s): Mackenzie et al.

* cited by examiner

MEDIA CONTENT SYNCHRONIZATION

CROSS-REFERENCE TO RELATED APPLICATIONS

The present application is a National Phase entry of PCT Application No. PCT/EP2016/077747, filed on Nov. 15, 2016, which claims priority to EP Patent Application No. 15196875.7, filed on Nov. 27, 2015, which are hereby fully incorporated herein by reference.

TECHNICAL FIELD

This invention relates to the synchronization of live media streams on two or more display devices.

BACKGROUND

In so-called second-screen applications, a viewer is typically watching a streamed video on a primary or main device and watching (or listening to) related content on a second device. In a common situation a first receiver unit associated with the primary screen receives a multicast transmission (that is, a transmission made to many end-users at substantially the same time), and a separate unicast (one to one) transmission is sent to a second receiver unit, typically a handheld tablet or smartphone device. Examples of such related content may be alternative camera angles, different soundtracks (e.g. language), play-along games, etc. These are usually of more specialized interest, and/or are interactive and therefore bespoke to the end-user, and thus are only transmitted on demand.

Other examples of multiple views include the creation of an immersive panoramic or full-360 degree view made by "stitching" several camera views together.

In many cases, the nature of the related content requires precise synchronization between the primary device and the second device (alternative camera angles, subtitles, stitching of views, multiple viewers, etc.). This can be difficult to achieve. In particular, the multicast transmission to a primary device may be over a wired or cabled broadband connection whereas a second, unicast, stream is typically transmitted over a wireless connection with a narrower bandwidth, either independently or relayed from the primary device over a local wireless connection. Transmission and buffering delays are unlikely to be identical in the two paths.

The displays to be synchronized may be of video content, but other display types are also possible, such as text (e.g. subtitles) or audio content.

Another situation in which synchronization can be important is when multiple viewers are linked to a single streaming source, and are linked by a "social chat" facility. It is desirable in such a case that all viewers are watching the same content in synchronization.

Where such transmissions are of live streams, one solution is to include an additional delay to allow adjustment of the start times of the streams to allow their synchronization. This is normally achieved by reference to an absolute time or clock, as described for example in ETSI DVB technical specifications. For example, the MPEG-DASH (Dynamic Adaptive Streaming over HTTP) protocol has segment header data including an absolute time reference enabling video synchronization based on those absolute time references. However some streaming protocols lack such an absolute reference. An example is the HLS (HTTP Live Streaming) protocol, which is a proprietary unicast streaming protocol for delivery of live or on-demand media, and is currently widely used for streaming video on mobile devices.

A further problem arises if the user wishes to interrupt the playing of the stream, and play a section out of sequence—for example to replay a section or, if the stream is not being viewed live, to "fast forward" to a point later in the stream. A user uses a "seek" command in the viewing controls to identify from which point in the stream the user wishes to resume playing. Various "trick play" systems are available to allow the user to identify the relevant part of the video stream in question and, having done so, the "seek" command then instructs the viewing apparatus to play from the segment in question. In such circumstances it is then necessary to re-synchronize the stream played on the second screen. This requires a second "seek" command, to identify the correct segment in the second stream and to resume playing it at the right time. It would be inconvenient and distracting for a user to have to repeat the "replay/fast forward" process for the second stream, and difficult to synchronize them exactly by eye.

SUMMARY

According to a first aspect of the disclosure, there is provided a process for synchronizing playback of output from a first content stream and a second content stream delivered to respective first and second receiving devices, each stream comprising a sequence of segments, wherein corresponding segments in the respective streams are identified by reference to a reference point common to the streams, the process being initiated by activation of a seek command on the first receiving device, identifying a start point in a first stream from which to resume display of content, and wherein the first receiving device reports the identified start point in the first stream to a synchronization controller, the synchronization controller identifies the segment in the first stream in which the start point is located and the duration of time between the start point and the beginning of the next segment in the sequence of segments, the synchronization controller transmits a command to the second receiving device identifying a corresponding segment in the second stream at which to resume play and a time at which to start displaying the second stream, to cause output of the content of the second stream to be resynchronized with the output of the content of the first stream.

According to a second aspect of the disclosure, there is provided a synchronization control device for coordinating play of first and second content streams delivered to respective first and second receiving devices, wherein corresponding segments in the respective streams are identified by reference to a reference point common to the streams, the synchronization control device having a first interface for intercepting, from a first receiving device, indication of a start point in a first stream from which display of content is to resume following a seek command, a synchronization controller for identifying a segment in the first stream in which the start point is located, and the duration of time between the start point and the beginning of the next segment, and a second interface for transmitting a command to a second receiving device identifying a segment in a second stream, at which to resume play, and a time at which to start displaying, to cause the display controlled by the second receiving device to be resynchronized with the display controlled by the first receiving device after operation of the seek command on the first device.

In one embodiment, the time at which the second receiving device is to resume play is the beginning of the next segment to begin after a predetermined minimum time has elapsed after the identified start point in the first stream. If a predetermined offset time or segment number is previously specified between display of corresponding segments in the first and second streams, that offset may be applied to the time or segment at which the second receiving device resumes play.

The synchronization control device may be integrated with one of the first and second receiving devices. Synchronization may be performed between more than two devices, by duplicating this process, so as to synchronize multiple second streams to a common first content stream.

BRIEF DESCRIPTION OF THE DRAWINGS

Embodiments of the disclosure will now be described, by way of example, with reference to the drawings, in which.

DETAILED DESCRIPTION

The embodiment as described is arranged to facilitate synchronization using mechanisms specific to HLS. The skilled person will appreciate that the embodiment may be adapted to other protocols.

HTTP Live Streaming (HLS) is a streaming protocol for delivery of live or on-demand media, including audio and video. HLS uses media in MPEG2 TS format. MPEG2 TS media data is divided into chunks of a fixed time length, for example 10 seconds. Each chunk of media data is stored in a separate file; these files are known as segments. Segments are numbered sequentially. Audio, video and any other associated data for the same time period are stored interleaved in the same segment. Clients play the media stream by downloading each of the segments in sequence using HTTP, and playing them out in sequence, such that the presented output is seamless and continuous.

Each segment starts with a decoder refresh point (referred to as an IDR or I-frame), which allows the player to begin playback at the start of any segment without requiring any media data stored in any previous segment.

Multiple versions of the same media stream can be made available by dividing the multiple versions of the stream into segments at the same time points. This allows clients to switch between different versions of the media stream at segment boundaries; this is typically used for adaptive streaming based on available network bandwidth, where the different versions of the media are at different bandwidth/quality levels.

In the case of a live stream the server maintains a manifest file which contains the numbers, names and time lengths of a fixed number of the most recent segments. The manifest is updated whenever new segments become available. The manifest does not indicate the absolute (also known as wall clock) time of the stream start or of any individual segment. Clients consume the media stream by periodically downloading the manifest file using HTTP and downloading any segments added to the end of the manifest which have not already been downloaded.

Figure 1:
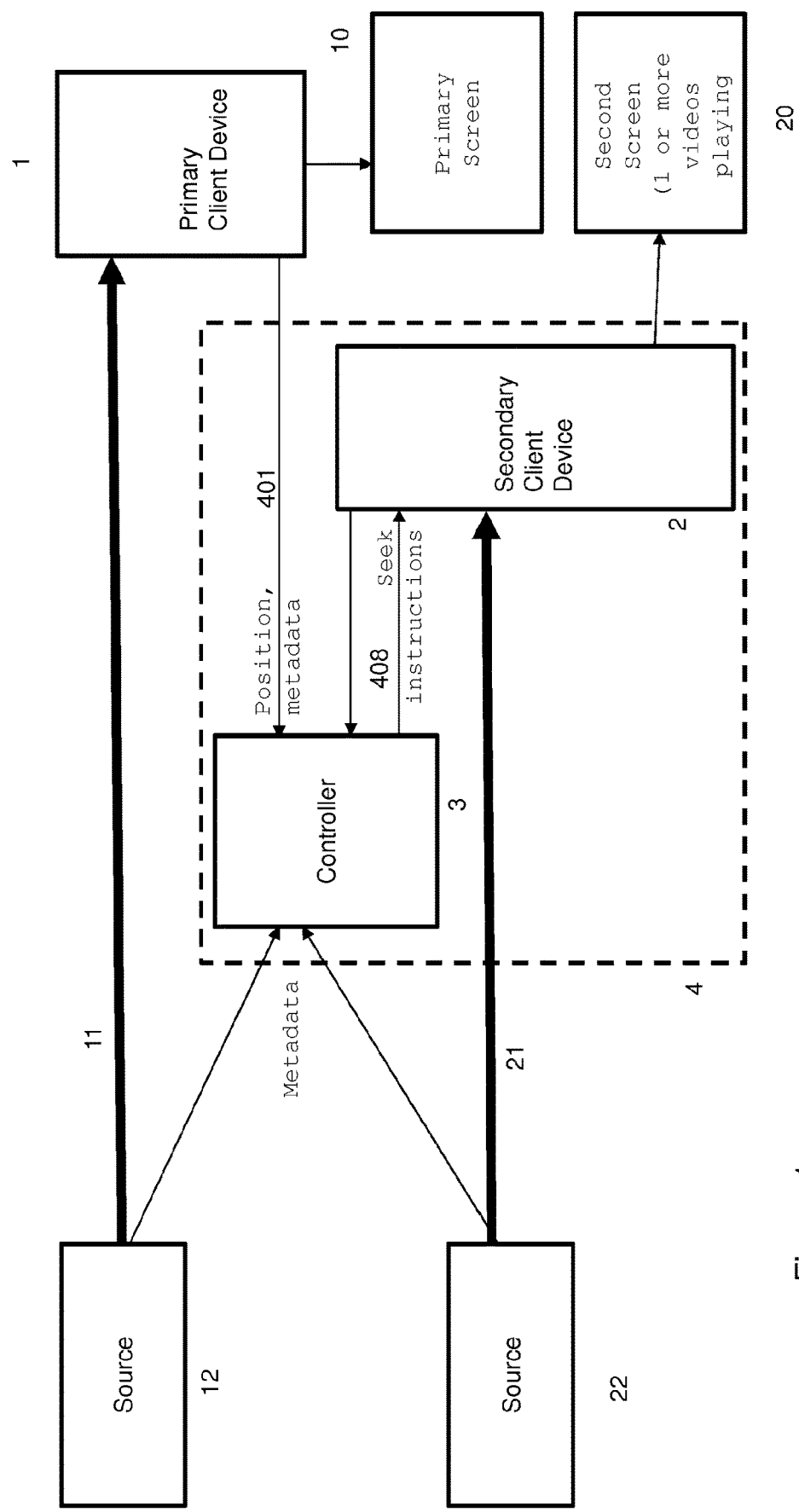
FIG. 1 depicts a general arrangement of the various elements that co-operate in an embodiment of the disclosure.

The architecture in which this embodiment operates is depicted in FIG. 1. It comprises two or more client devices 1, 2 each of which can play one or more media streams, for display on respective associated screens or other display devices 10, 20. The term "display" in this context includes video, audio, and audio-visual output. A synchronization controller 3 coordinates synchronization of the outputs delivered by the client devices 1, 2. The controller is in communication with each of the client devices, for example through a networking protocol, such as over a wireless LAN.

Figure 1A:
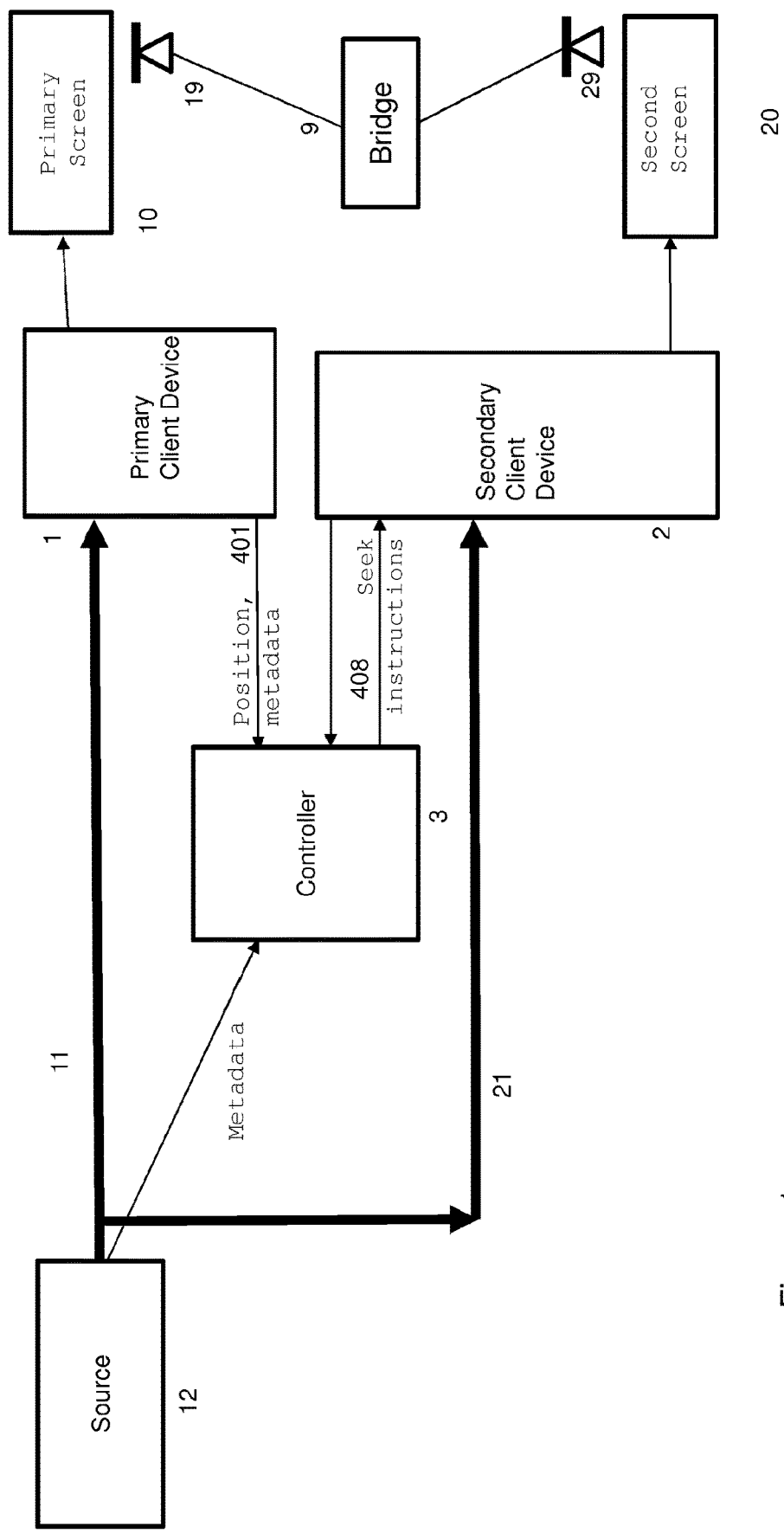
FIG. 1a depicts a general arrangement of the various elements that co-operate in another embodiment of the disclosure.

As shown in FIG. 1a, the client devices 1, 2 and associated screens 10, 20 may be in use by different users in different locations, all receiving content from a common source 12. If the users are discussing the content over an audio connection 19-29, for example over a conference bridge 9, it is desirable that the video feeds 11, 21 are synchronized.

As shown in FIG. 1, the client devices may instead be all used by the same user, receiving separate but related feeds 11, 21 for display on separate display devices 10, 20. These may provide, for example, different camera viewpoints of the same event. When being used for such "second screen" applications, the client devices 1, 2 and associated screens 10, 20 are likely to be used by the same person, but physical proximity of the client devices to each other is not a requirement for the embodiment to operate. The client devices 1, 2 do not need to communicate directly with each other, nor do they need to be topologically co-located with each other, or with the synchronization controller. For example, the controller 3 may be on a separate local network from each of the client devices 1, 2 and each of the media servers 12, 22, where the local networks are connected via one or more wide area networks.

In some arrangements, the synchronization controller 3 and one of the client devices 2 may be integrated into a single device 4, as depicted in FIG. 1. However, the synchronization controller 3 may be at a location remote from any of the client devices 1, 2, as depicted in FIG. 1a.

Each client device 1, 2 receives one or more media streams 11, 21. In many cases the streams 11, 21 may both be delivered from one and the same media server, but in general the controller 3 is capable of operation with feeds from different sources 12, 22, as depicted.

Figure 2:
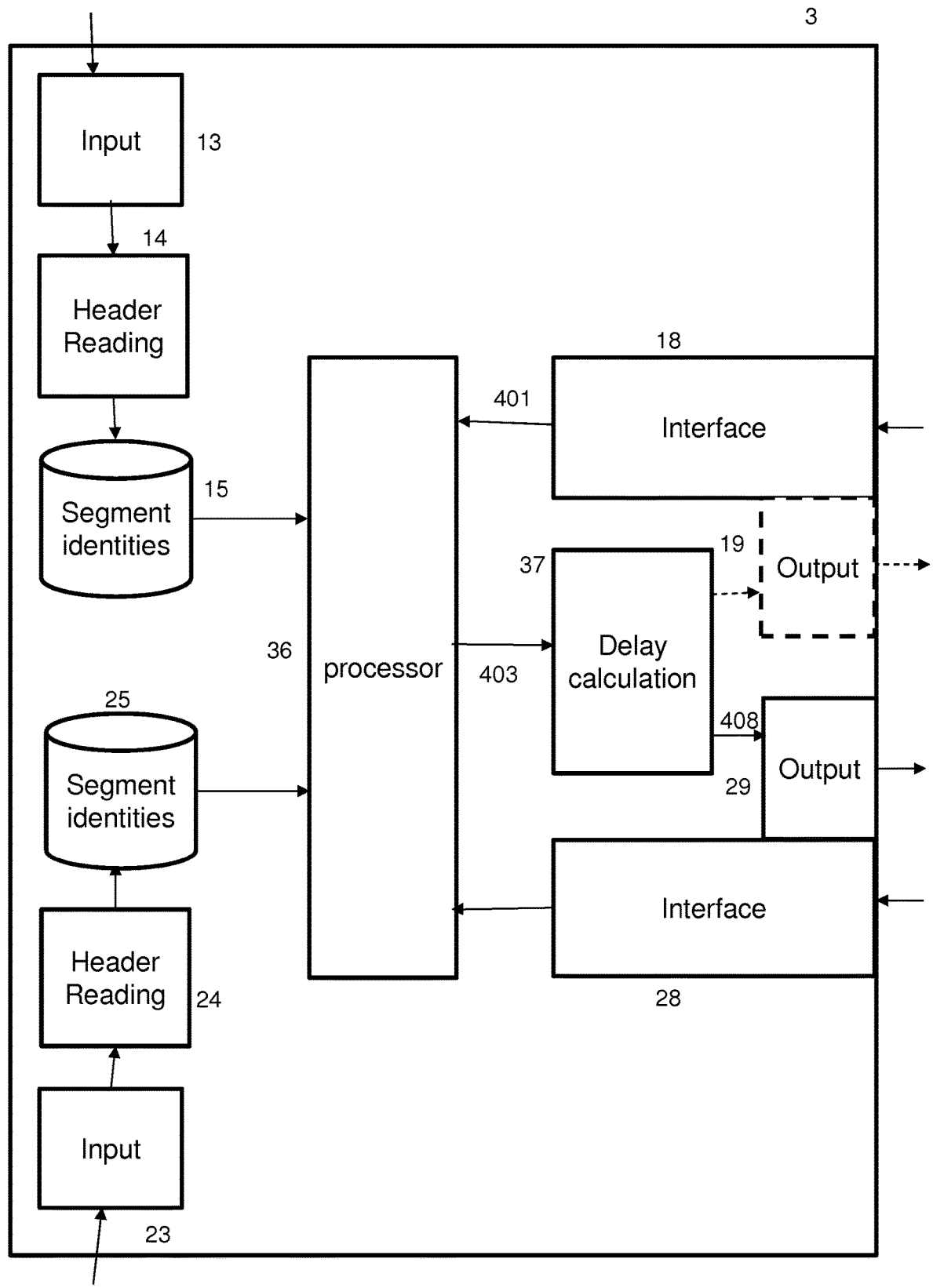
FIG. 2 is a schematic of a device for synchronizing streamed content.

The functional elements of the controller 3 are depicted schematically in FIG. 2. It will be appreciated by those skilled in the art that some or all of these elements may be implemented in software running on a general purpose computer, or coded in firmware. The controller is controlled by a processor 36.

The controller comprises first and second input ports 13, 23, for monitoring the data segments carried by the respective data streams 11, 21 being delivered to the client devices 1, 2. Respective header-reading elements 14, 24 identify the individual segments, and deliver their identities to respective stores 15, 25.

The processor 36 has interfaces 18, 28 associated with the respective client devices 1, 2. Periodically, the data stores 15, 25 can be accessed by the processor 36 to calculate a timeshift value which is stored in a data store 37 and transmitted to at least one of the outputs 18, 28 for transmission to the respective client device 1, 2 to cause it to synchronize its output with the other client device.

Figure 3:
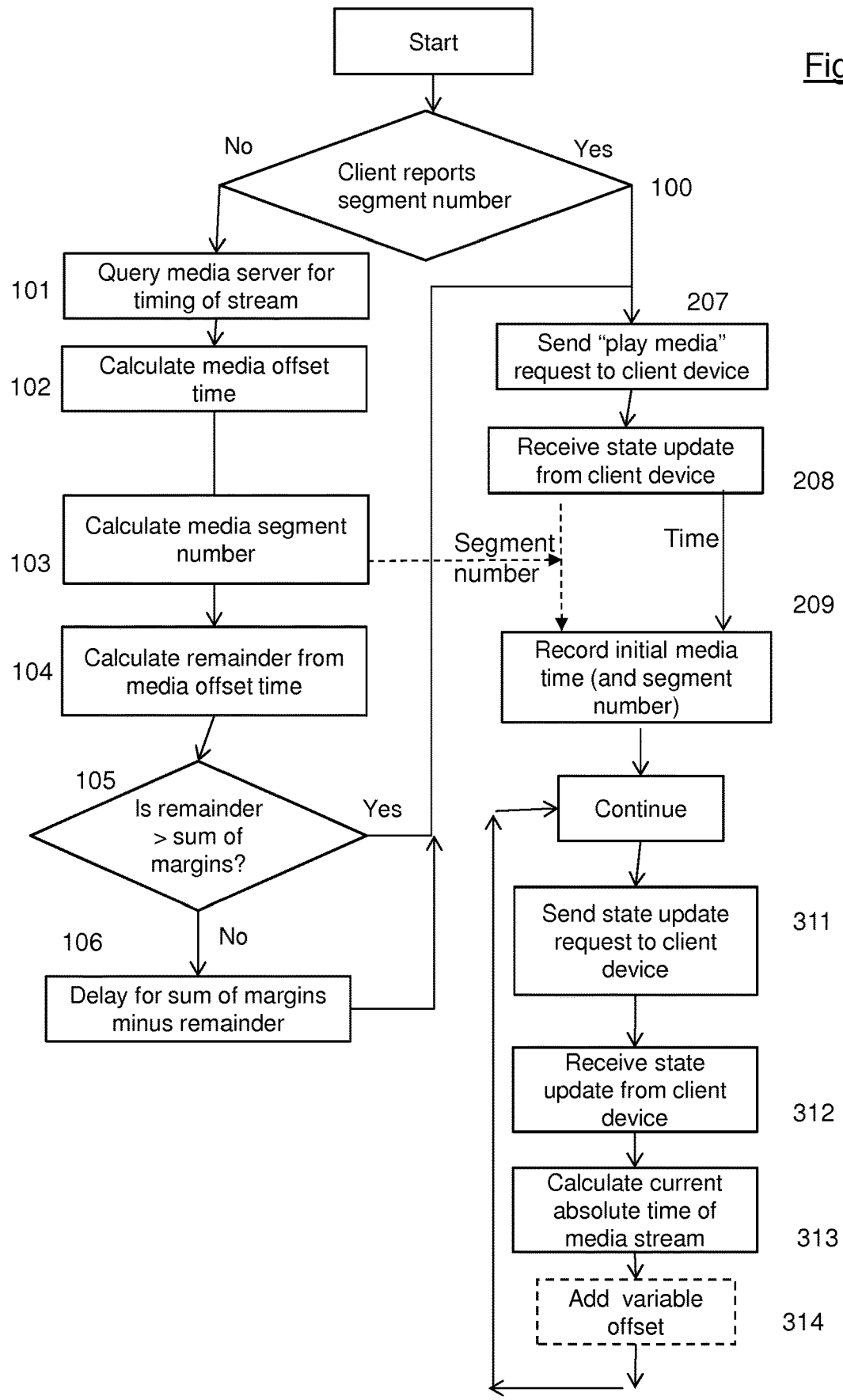
FIG. 3 illustrates the process for initially synchronizing the streams.
Figure 5:
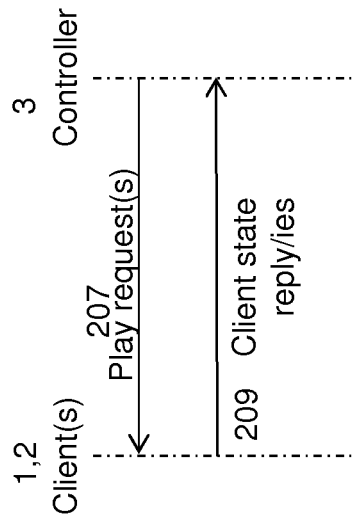
FIG. 5 is a sequence diagram illustrating a first process for starting playback when segment numbers are reported.
Figure 6:
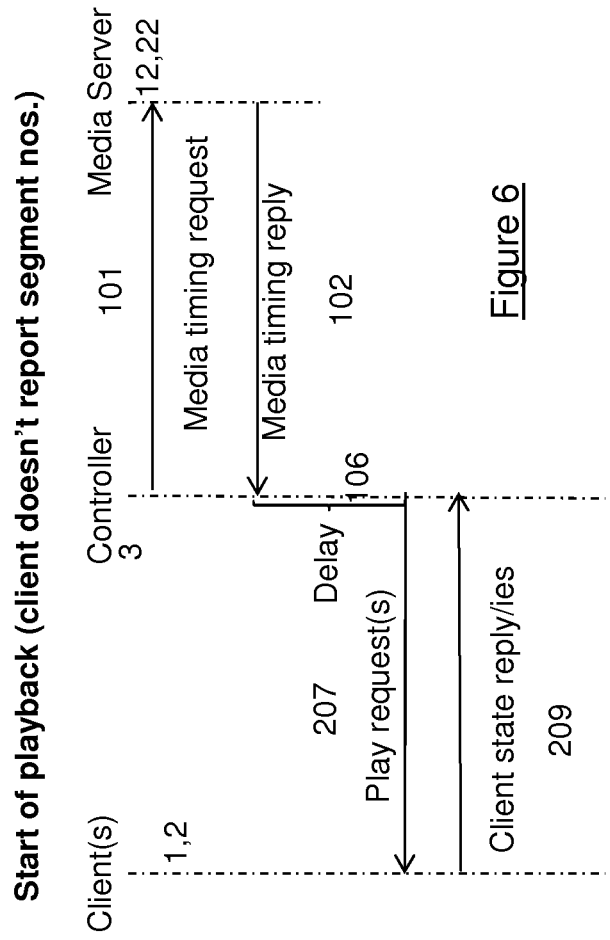
FIG. 6 is a sequence diagram illustrating an alternative process for starting playback when segment numbers are not reported.

This embodiment comprises a two-stage method. The first stage is depicted in FIG. 3, FIG. 5 and FIG. 6, (at 100-314) and uses a method disclosed in ETSI TS 103 286-2 to determine the current time position in each media stream during playback by querying each client device. In this stage, segments of the stream are mapped to an absolute timing reference, which is derived from the arithmetical product of the segment number and the segment length, referenced to a nominal stream start time, in order to obtain a current media time. Using a reference time generated by one of the devices to be synchronized reduces the processing power required to achieve synchronization, compared with synchronization to a centrally controlled time, as the client device is already operating in the time frame to be used when it is required to synchronize to the other device. The nominal stream start times are estimated in the controller, based on relative times reported by each client device. The actual estimation process will be specific to the type of media being synchronized and the type of client device playing the media.

Figure 4:
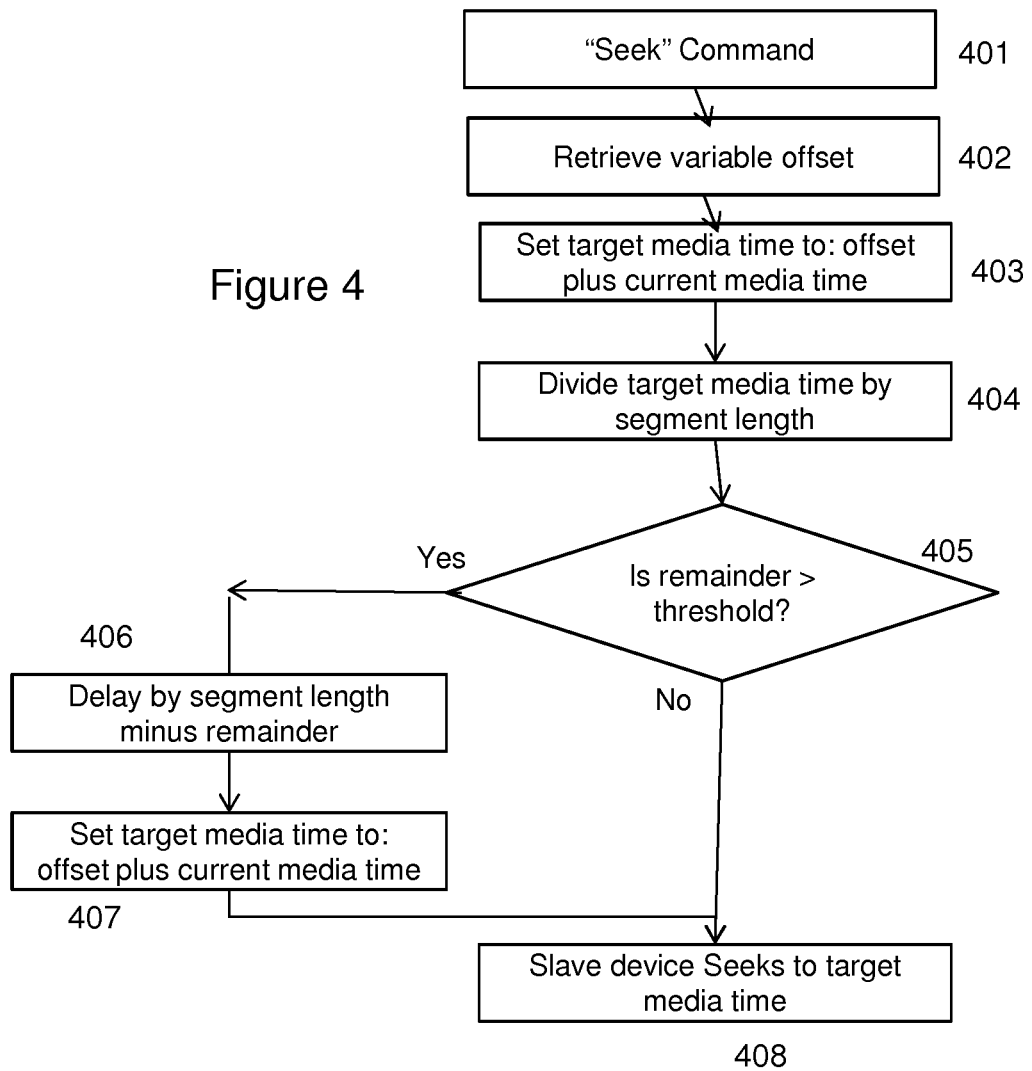
FIG. 4 illustrates the process for synchronizing the streams after a "seek" command.
Figure 7:
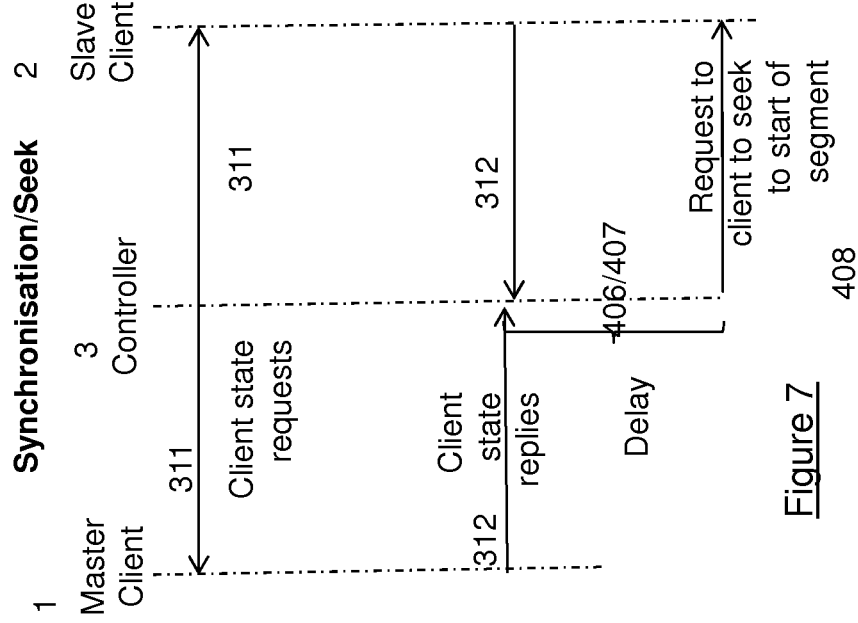
FIG. 7 is a sequence diagram for synchronization of the two streams after a "seek" request.

The second stage, depicted in FIG. 4 and FIG. 7, then controls the playback of one or both media streams, by buffering or "fast-forwarding" playback, to bring the media streams into synchronization within an acceptable threshold. As standard HLS segments are not indexed, it is not possible to directly identify which segment in a first stream is being played, or which segment of the second stream corresponds to it. The actual processes of seeking will be specific to the type of media being synchronized and the type of client device playing the media.

The time-location process of FIGS. 3, 5 and 6 will now be discussed in more detail.

The method of determining the current time position of a media stream is specific to the type of media being synchronized and the type of client device playing the media, in particular, it depends on whether the client devices 1, 2 report the current segment number.

A mapping between HLS segment numbers in different streams requires that they can be both related to a reference timescale common to them. This can be defined as a nominal stream start time plus the segment number times the segment length. The nominal stream start time can either be referenced to a standard value, such as the Unix epoch (seconds after midnight UTC, Jan. 1, 1970), or could be a stream-specific value stored in the manifest or elsewhere as an additional field, defining which segment in each stream corresponds to a reference time T=0. The nominal stream start time is not required to equal the actual clock time at which the stream or the stream content was started.

To determine the current time position of a media stream on a client device the process comprises an initial process to be applied when the controller requests that the client device begins playing a media stream (at 101-105, 207-209), and a repeating process (at 311-314) to be subsequently applied whenever the controller queries the state of the client device to determine the current position of a media stream being played on the client device.

The initial process has two variants depending on whether the client device reports the initial segment number. In the case where the client device does not report the initial segment number, initially 101-105 are performed to deduce the initial segment number by the controller choosing the time at which the playback request is sent to the client device before proceeding to the process at 207-209. This also requires that the clocks of the controller and media server are reasonably synchronized. If the initial segment number is reported by the clients, the initial process (at 101-106) can be omitted and the process starts at 207.

As shown in FIG. 1, if the primary client device is of a type that reports the segment number (at 100) the controller initially sends a request to begin media playback to the client device (at 207). The client device starts playback (at 208) and responds to the controller with the state of the client device just after media playback has been started (at 209), and the controller records the media time and segment number (at 210) as indicated in the response from the client device.

If the primary client device is of a type which does not record the segment number the controller has to derive a reference time by identifying when new segments are expected to be published at the media server, and at what time it sent the request to the primary client device to start playback. The controller can then use this derived reference time to identify the segment at the primary client device will start. In order for this to operate reliably, the controller must avoid sending a request to the primary client device to start playback too close to when the server is expected to publish a new segment, as any timing or other variations could cause the controller to estimate a value associated with the wrong segment. The margins before and after new segments are expected to be published are defined as the pre- and post-publication margins; the values of these margins are implementation-defined.

In this process the controller first queries the media server associated with the stream for the nominal stream start time (T0) and the length (t) of each segment in the stream (at 101). It is assumed that each segment is of the same length. The controller then subtracts the nominal stream start time from the current time T, and adds a pre-publication margin Tp; to produce a media offset time $Tm=T+Tp-T0$ (at 102).

The controller divides the media offset time by the segment length, to produce a division result and a remainder (at 103). The division result minus the number of segments back that the client device starts playing from is recorded as the current segment number (at 104)

The controller then tests if the remainder is greater than the sum of the pre- and post-publication margins (at 105).

If the remainder is less than these margins, this indicates that the current time is too close to a segment boundary for the controller to be able to correctly determine which segment the client device would start with, if the client device was requested to begin playback immediately. The controller then inserts a delay (at 106) for the value of the sum of the pre- and post-publication margins minus the remainder, until the current time is to no longer too close to a segment boundary.

This (106) is omitted if the remainder is already greater than the sum of the pre- and post-publication margins, as this indicates that the current time is not near to a segment boundary, so the controller can request that the client device begin playback immediately.

The process then continues as for the method already described, wherein the controller sends a request to begin media playback to the primary client device (at 207), the primary client device responds to the controller with the state of the client device just after media playback has been started (at 208) and the controller records the media time as indicated in the response from the primary client device (at 209). However, in this case the segment number is derived from the controller's own calculation (at 103) instead of the response (at 209) from the primary client device, which only indicates the time.

The creation of this time reference can be used to synchronize multiple feeds when operating in "second screen" systems, where a user is taking two feeds of the same program on different devices not sharing a common feed, as shown in FIG. 1. If the feeds have already been downloaded to the devices, synchronization can be done by advancing one playback by omitting segments, and/or by retarding the other feed by pausing playback, until both devices are at the beginning of the segments in each feed which correspond. Of course, if the feeds are live, it is only possible to pause display of the stream that is currently ahead, to await download to the other device of the segment corresponding to that at which the first stream has been paused, or to advance within the buffer of already downloaded media stream data which has not yet been played.

A possible use case would be for a viewer watching motor racing where additional camera feeds are provided from on-board the racing vehicles and from helicopter cameras in addition to the primary editorial feed. The viewer would watch the primary program on the TV, while watching additional video feeds on a companion screen application running on a tablet or smartphone.

Periodically, the controller requests (at 311) that the client device report its current state, and the client device responds with a report (at 312) of its current state. This includes the current media position of the media stream. The controller calculates the absolute time of the current position of the media stream (at 313) as the nominal stream start time plus the current media position (as reported in 312) minus the initial media time (as determined in 210) plus the product of the segment length and the initial media segment number.

Having determined the absolute time of the media stream the controller may add an additional variable offset (at 314) to the absolute time of the media stream. This offset could for example be the sum of one or more of:

- A user-defined timing offset, to allow end-user customization of the synchronization of a particular stream. For example the user could view a stream as a synchronized 10 second delayed replay stream, instead of a live synchronized stream. This offset could be adjusted by the user while the stream is playing.
- A stream-specific timing offset used to compensate for variations in the content capture and encoding process, where the absolute time of the content encoding is significantly different from the absolute time at which the content was captured. For example, this could be applied to correct delays in streams from wireless cameras on-board vehicles in a motor-racing event, as such streams are significantly delayed relative to wired track-side cameras.

The use of segment data is used in this embodiment to "seek" or adjust the buffering of a media stream in a format such as HLS, which does not have an absolute timing reference.

The two devices 1, 2 can be synchronized by identifying the segments which have been or are about to be downloaded to each device, which have start times at or the closest after the time point in each media stream to which the seek command is directed, to achieve synchronization, and then playing each stream from the beginning of that segment, after a delay equal to the difference between the desired time in the media stream to seek to, and the start time of the segment, if non-zero, such that the streams become synchronized once both streams have begun playing. As discussed above, a user may impose an additional offset, for example to compensate for any latency in the communication between the controller 3 and the playback devices 1, 2.

When viewing a transmission in "second screen" mode, a user will wish both displays to respond when he operates a control, such as rewind or playback, on either one of the devices. For present purposes the device operated directly will be referred to as the "master" device and the indirectly controlled device as the "slave" device. For example, the "master" device 1 may be satellite television "set top box" associated with a widescreen television set 10 and controlled by a remote control unit, and the "slave" device 2 may incorporated in a handheld "tablet" computer 4 with an associated display 20 connected to the "Internet" through a wireless LAN. If the user operates a rewind control on the remote control unit, causing the content displayed on the widescreen television set to reverse, the user will wish the content on the tablet computer to do the same. Conversely, the user may wish to control the content on both the tablet display 20 and the widescreen television set 10 from the controls on the tablet 4. The "master" unit in each case is the one directly controlled by the user, and the "slave" unit is the device which adjusts its timing to synchronize with the master.

It should be noted, however, that if the feeds are being transmitted in real time, it is not possible to skip forward other than within the playback buffer of already downloaded but not yet played media data, as the later segment will not yet have been received, so any adjustment in timing has to be by pausing one stream for the other to catch up, except where one stream can be advanced within its playback buffer between its current position and the live edge. Thus, of two units 1, 2 receiving live video streams, the master unit will be the one that receives each segment of its stream later than the other unit, if it is not possible to seek forward in time in the other stream.

Following fulfillment of a playback or rewind request to the master unit 1, the streams require resynchronization, and this is achieved by changing the current media time of the slave stream in playback, by adding or subtracting a time offset from the current media time to match the current time of the "master" device. As neither device is now operating in real time, the offset calculated can be positive or negative.

The method of FIG. 4 works by only seeking the HLS media stream to the next segment boundary. HLS segments are not indexed, so attempting to seek into the middle of a segment would require the client to parse all of the media data between the start of the segment and the seek point identified by the seek command. Of that media data, at least the media data between the seek point and the previous decoder refresh point would need to be decoded. This introduces a significant delay, potentially as much as the time that would be required to play out the media data from the seek point to the end of the segment at normal playback speed. This delay would not be acceptable for media synchronization. This is avoided by continuing to play the media stream until such a time as an adjustment of the required offset can be made by a seek to the start of a segment. HLS segments are specified to start with a decoder refresh point (also referred to as an IDR or I-frame), such that the player can begin playback immediately at that point.

The method of FIG. 4 and FIG. 7 is executed by the controller 3, in co-operation with the client devices 1, 2. The method starts when the controller is about to adjust the playback of the media streams by a positive or negative time offset, for example by "rewinding" or "fast forwarding" to a point in the stream selected by the user and reported by the master device 1 to the controller (at 401). The point to which the user has moved in the stream 21 running on the master device 1 (the "second screen") is compared with the time that it would have reached had the command not been given. Any user-applied offset figure (at 314) is retrieved (at 402) and added to the current media time to form the target media time (at 403). This is the time that would be the seek point, if the seek command were performed immediately.

The target media time is divided by the segment length, to produce a remainder (at 404). This remainder is the time elapsed between the beginning of the segment and the target media time, in other words how close the time selected by the user is to the beginning of the segment in which it falls.

A test is performed to determine if the remainder is less than a threshold value (at 405), selected to allow sufficient processing time to allow playback of the slave stream to start at the beginning of the next segment. If the remainder is greater than this threshold, (in other words, the time selected is close to the end of the current segment) playback on the slave device is delayed for the duration of one segment, minus the remainder (at 406) and the offset is added to the current media time to amend the target media time, as the current media time has now changed (at 407). The target media time, as determined in 403, as adjusted by 407 if applicable, now corresponds to the start of a segment. The slave device 2 is then instructed to seek to the target media time (at 408) and synchronize with the master device 2, following 311-314 as above, such that the slave device resumes playing at the beginning of a segment, at the same time that the master device reaches the beginning of the corresponding segment.

This allows playback to be initiated on the slave device with less delay than would be required by parsing the entire segment. The delay between playback starting on the master device and playback resuming on the slave device would be, at a maximum, the segment length plus the threshold value set in 405.

The invention claimed is:

1. A method for synchronizing playback of output from a first content stream and a second content stream, the method comprising:
   delivering the first content stream and the second content stream to a first receiving device and a second receiving device, respectively, the first content stream and the second content streams being different from one another and each being retrieved by the respective first receiving device and the second receiving device as sequences of segments identified in a manifest file available to both the first receiving device and the second receiving device, each segment in the first content stream having a first predetermined length, and each segment in the second content stream having a second predetermined length different from the first predetermined length, wherein a reference point common to the first content stream and the second content stream is identified in the manifest file and segments in the respective first content stream and the second content stream which correspond in time are identified with respect to the reference point according to the respective lengths of the segments in the respective first content stream and the second content stream, by:
   activating a seek command on the first receiving device, identifying a start point in the first content stream from which to resume display of content;
   reporting, by the first receiving device, the identified start point in the first content stream to a synchronization controller;
   identifying, by the synchronization controller, the segment in the first content stream in which the start point is located and a duration of time between the start point and a beginning of the next segment in the sequence of segments; and
   transmitting, by the synchronization controller, a command to the second receiving device identifying a corresponding segment in the second content stream at which to resume play and a time at which to start displaying the second content stream,
   to cause output of the second content stream to be resynchronized with output of the first content stream.

2. The method according to claim 1, wherein the time at which the second receiving device is to resume play is the beginning of the next segment to begin after a predetermined minimum time has elapsed after the identified start point in the first content stream.

3. The method according to claim 1, wherein if a predetermined offset time or segment number is previously specified between display of corresponding segments in the first and second content streams, that offset time is applied to the time or segment at which the second receiving device resumes play.

4. A synchronization control device for coordinating play of first and second content streams, comprising:
   a first interface for intercepting, from a first receiving device, indication of a start point in a first content stream from which display of content is to resume following a seek command;
   a synchronization controller for identifying a segment in the first content stream in which the start point is located, and a duration of time between the start point and a beginning of the next segment; and
   a second interface for transmitting a command to a second receiving device identifying a segment in a second content stream at which to resume play, and a time at which to start displaying,
   to cause a display controlled by the second receiving device to be resynchronized with a display controlled by the first receiving device after operation of the seek command on the first receiving device,
   wherein the first content stream is different than the second content stream, wherein the first and second content streams are delivered respectively to the first receiving device and the second receiving device, the first content stream and the second content stream each comprising a series of segments identified in a manifest file available to both the first receiving device and the second receiving device, and wherein corresponding segments in the respective first content stream and the second content stream are identified by reference to a reference point common to the first content stream and the second content stream.

5. The synchronization control device according to claim 4, arranged such that the time at which the second receiving device is to resume play is the beginning of the next segment to begin after a predetermined minimum time has elapsed after the identified start point in the first content stream.

6. The synchronization control device according to claim 4, arranged such that, if a predetermined offset time or segment number is previously specified between display of corresponding segments in the first and second content streams, that predetermined offset time is applied to the time or segment at which the second receiving device resumes play.

7. The synchronization control device according to claim 4, wherein the synchronization control device is integrated with one of the first or second receiving devices.

8. The method according to claim 1, wherein the first content stream and a second content stream comprise different camera view-points of a same event.

9. The synchronization control device according to claim 4, wherein the first content stream and a second content stream comprise different camera view-points of a same event.

* * * * *